No. 764,472.

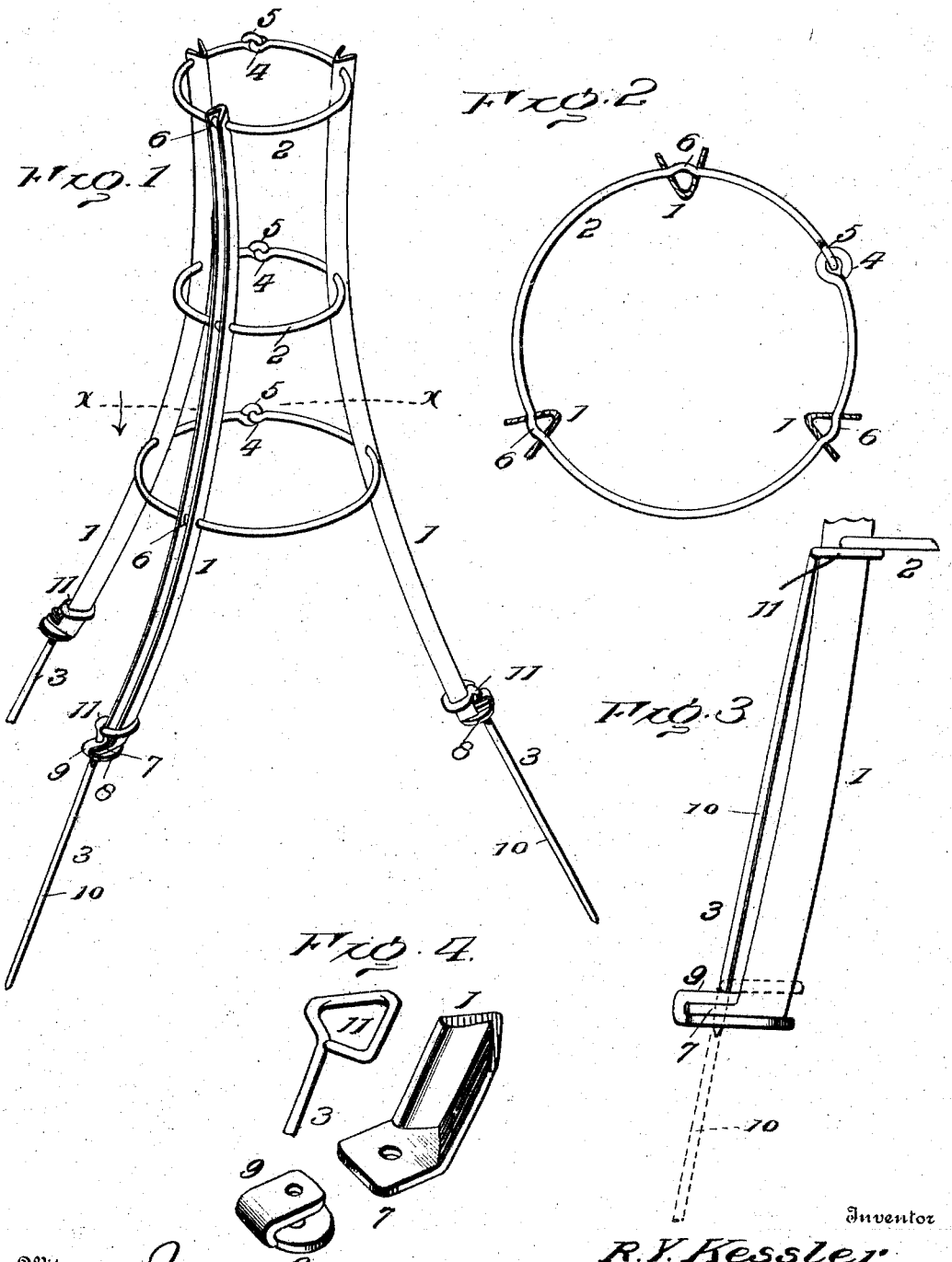

Patented July 5, 1904.

UNITED STATES PATENT OFFICE.

RICHARD Y. KESSLER, OF PAWNEE, ILLINOIS.

SUPPORT FOR PLANTS.

SPECIFICATION forming part of Letters Patent No. 764,472, dated July 5, 1904.

Application filed April 15, 1904. Serial No. 203,327. (No model.)

*To all whom it may concern:*

Be it known that I, RICHARD Y. KESSLER, a citizen of the United States, residing at Pawnee, in the county of Sangamon and State of Illinois, have invented certain new and useful Improvements in Supports for Plants, of which the following is a specification.

The purpose of this invention is to devise a support or brace of novel form for plants, vines, shrubs, and flowers, the device being of such construction as to enable a quantity to be stored in a comparatively small space, which is of material advantage for transportation and for housing the support during the winter season.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a support embodying the invention. Fig. 2 is a plan section on the line X X of Fig. 1. Fig. 3 is a detail view of the lower portion of one of the bars of the support, showing the pin moved upward in full lines and pressed downward by dotted lines. Fig. 4 is a detail perspective view of a foot-piece.

Corresponding and like parts are referred to in the following description and indicated in all the views of the drawings by the same reference characters.

The support is composed of a series of bars or uprights 1, hoops or bands 2, and anchoring-pins 3. The support flares at its lower end so as to form a bracing-support. The bars or uprights 1 curve throughout their length and are outwardly diverged at their lower ends to give the desired spread to the support. The hoops or bands 2 are preferably of stout wire, the gage depending upon the size of the support and the nature of the plant, shrub, bush, or vine to be supported thereby. The terminal portions of the blanks or lengths of wire constituting the hoops or bands are so formed as to admit of their interlocking when brought together, and for this purpose an eye 4 is provided at one end of the blank and a hook 5 at the opposite end. Obviously any suitable connecting means may be provided. When the ends of the blanks comprising the hoops or bands 2 are disengaged, the support may be opened so as to be passed around the plant, shrub, bush, or the like, or said support may be flattened, thereby admitting of a number being closely piled, so as to occupy a minimum amount of space.

The bars or uprights 1 may be of any construction; but it is preferred to have them deflected intermediate of their longitudinal edges so as to form opposing wings which brace the bars and enable them to be constructed of comparatively thin material. The bars or uprights in their preferable formation are of V shape in cross-section, and openings are formed in the opposing wings of each for the passage therethrough of the hoops or bands 2. To maintain the parts in determinate position, the hoops or bands are crimped, as shown at 6, at points between the wings of the bars or uprights, thereby preventing movement of said bars on the hoops.

To prevent the support from sinking in soft ground, the bars or uprights 1 have their lower ends outturned, as shown at 7, to form feet. To provide additional supporting-surface, shoes 8 are fitted to the feet 7 and are provided with recurved portions 9, which overlap the feet 7, the latter being confined between the shoes 8 and the recurved portions 9 thereof.

For keeping the support in place anchoring-pins 10 are provided and are slidable upon the lower portion of the bars or uprights 1. A loop 11 is formed at the upper end of each anchoring-pin 10 and encircles the bar or upright and retains the pin in place. The lower portion of each pin is passed through registering openings formed in the feet 7, shoes 8, and recurved portions 9. By this means the shoes are held to the support and are prevented from casual displacement. When the anchoring-pins are drawn upward into contact with the lowermost hoop or band, their points project below the shoes 8 a short distance. Hence casual displacement of the shoes and slipping of the lower ends of the pins are obviated. The hollow sides of the bars or uprights face outward, and the anchoring-pins are arranged opposite to said hollow sides, thereby enabling the parts to be compactly arranged.

In accordance with this invention the support-braces are provided in different sizes, and they are supplied to the trade in approximately flattened form. The plant, bush, shrub, or the like to be braced or protected has the support fitted therearound and secured in place by pressing or driving the anchoring-pins into the ground. The peculiar formation of the shoes 8 and their recurved portions 9 admit of connections being secured in the fold and made fast to pins or other objects a distance from the support, so as to supplement the action of the anchoring-pins for holding the support in place.

Having thus described the invention, what is claimed as new is—

1. In a support, the combination of bars having feet at their lower ends, anchoring-pins passing through openings in the feet aforesaid, and a slidable connection between the upper ends of the anchoring-pins and the bars.

2. In a support, the combination of bars provided with feet at their lower ends, shoes fitted to said feet, and anchoring-pins slidable upon the bars and adapted to hold the shoes in place, substantially as specified.

3. In a support, the combination of bars having their lower ends bent to form feet, shoes fitted to said feet and having recurved portions which overlap the feet and are secured thereto, and anchoring-pins engaging the feet and the complemental parts of the shoes, substantially as set forth.

4. In a support, the combination of bars, connecting hoops or bands, feet at the lower ends of the bars, shoes fitted to the feet, and anchoring-pins slidable upon the lower portions of the bars and having loops at their upper ends and their lower ends passed through registering openings in the feet and complemental parts of the shoes, substantially as set forth.

In testimony whereof I affix my signature in presence of two witnesses.

RICHARD Y. KESSLER. [L. S.]

Witnesses:
  CHAS. G. FISHER,
  FRED. H. DEIHL.